United States Patent [19]

Haartsen

[11] Patent Number: 5,598,459
[45] Date of Patent: Jan. 28, 1997

[54] AUTHENTICATION AND HANDOVER METHODS AND SYSTEMS FOR RADIO PERSONAL COMMUNICATIONS

[75] Inventor: Jacobus C. Haartsen, Staffanstorp, Sweden

[73] Assignee: Ericsson Inc., Research Triangle Park, N.C.

[21] Appl. No.: 496,353

[22] Filed: Jun. 29, 1995

[51] Int. Cl.$^6$ ............... H04Q 7/24; H04Q 7/28; H04Q 7/38
[52] U.S. Cl. ............... 379/58; 379/59; 455/11.1; 455/33.1
[58] Field of Search ............ 379/58, 59; 455/11.1, 455/33.1, 54.1

[56] References Cited

U.S. PATENT DOCUMENTS

| | | | |
|---|---|---|---|
| 4,661,972 | 2/1986 | Kai | 379/57 |
| 4,882,765 | 11/1989 | Maxwell et al. | 455/18 |
| 4,906,989 | 3/1990 | Kasugai | 340/825.44 |
| 5,091,942 | 2/1992 | Dent | 380/46 |
| 5,276,686 | 1/1994 | Ito | 370/95.1 |
| 5,297,190 | 3/1994 | Ito | 379/58 |
| 5,345,448 | 9/1994 | Keskitalo | 370/95.3 |
| 5,408,679 | 4/1995 | Masuda | 455/11.1 |
| 5,428,668 | 6/1995 | Dent et al. | 379/59 |
| 5,488,649 | 1/1996 | Schellinger | 379/62 |

OTHER PUBLICATIONS

Blecher, *Advanced Mobile Phone Service*, IEEE Transactions on Vehicular Technology, vol. VT-29, No. 2, May 1980, pp. 238-244.

*Primary Examiner*—Curtis Kuntz
*Assistant Examiner*—Nay Aung Maung
*Attorney, Agent, or Firm*—Bell, Seltzer, Park & Gibson

[57] ABSTRACT

During handover of a cellular terminal from a wide area cellular network to a base station, authentication messages are relayed between the base station and the wide area cellular network via the cellular terminal. Communications between the cellular terminal and the wire telephone network via the base station are prevented until after authentication takes place. Accordingly, the cellular terminal relays authentication messages between the base station and the wide area cellular network. Use of the wire telephone network for authentication between the cellular terminal and the base station is avoided. Secure handover is thereby provided without incurring excess overhead to the system and without adding unnecessary wire network charges to the cellular terminal user.

21 Claims, 9 Drawing Sheets

AUTHENTICATION AND HANDOVER METHODS AND SYSTEMS FOR RADIO PERSONAL COMMUNICATIONS

FIELD OF THE INVENTION

This invention relates to communications systems and more particularly to radio personal communications systems for use within wide area cellular networks.

BACKGROUND OF THE INVENTION

Radio communications systems are increasingly being used for wireless communications. An example of a radio communications system is a cellular phone network. Cellular radio communications systems are wide area communications networks which utilize a frequency (channel) reuse pattern. The design and operation of an analog cellular phone system is described in an article entitled Advanced Cellular terminal Phone Service by Blecher, IEEE Transactions on Vehicular Technology, Vol. VT29, No. 2, May, 1980, pp. 238–244. The analog cellular system is also referred to as the "AMPS" system.

Recently, digital cellular phone systems have also been proposed and implemented using a Time-Division Multiple Access (TDMA) architecture. Standards have also been set by the Electronics Industries Association (EIA) and the Telecommunications Industries Association (TIA) for an American Digital Cellular (ADC) architecture which is a dual mode analog and digital system following EIA/TIA document IS-54B. Telephones which implement the IS-54B dual mode architecture are presently being marketed by the assignee of the present invention. Different standards have been promulgated for digital cellular phone systems in Europe. The European digital cellular system, also referred to as GSM, also uses a TDMA architecture.

Proposals have recently been made to expand the cellular phone system into a radio personal communications system. The radio personal communications system provides voice, digital, video and/or multimedia communications using cellular terminals. Thus, any form of information may be sent and received. Cellular terminals include a radio telephone, such as a cellular telephone, and may also include other components for voice, digital, video and/or multimedia communications.

A radio personal communications system includes at least one telephone base station, also referred to herein as a "base station". A base station is a low power transceiver which communicates with a cellular terminal such as a cellular telephone over a limited local region, such as tens of meters, and is also electrically connected to the conventional public wire telephone network. The base station allows the owner of a cellular terminal to directly access the wire telephone network when in the local region, without passing through the cellular phone network, whose access rates are typically more costly. When located outside the local region of the base station, the cellular terminal automatically communicates with the wide area cellular network at the prevailing access rates.

A major problem in implementing a radio personal communications system is security for communications between the base station and the cellular terminal. Modern cellular telephone networks include security systems and methods to prevent eavesdropping and telephone fraud. Eavesdropping may be prevented by using encryption of radio transmissions between a cellular phone and a cellular network. Fraud may be prevented by preventing radio telephone transmissions between the cellular phone and the cellular network unless identification information is successfully exchanged between the cellular phone and the cellular network. Existing cellular systems, such as the AMPS system, the ADC system and the GSM system each include their own security systems and methods. Security should not be compromised by communications between a cellular terminal and the base station of a radio personal communications system.

Security is a major concern during handover from the wide area cellular network to the telephone base station when the cellular terminal enters the local region of the telephone base station. During this handover, the telephone base station typically initiates an authentication process in order to verify that the cellular terminal is authorized to communicate with the telephone base station. If authorized, the cellular terminal is disconnected from the wide area cellular network and locked into the telephone base station. During such a handover, security must be preserved without adding excessive overhead to system performance.

A major advance in providing a secure telephone base station is described in application Ser. No. 08/205,705 filed on Mar. 3, 1994 entitled Secure Radio Personal Communication System and Method by Paul W. Dent and the present inventor Jaap Haartsen, assigned to the assignee of the present application, the disclosure of which is hereby incorporated herein by reference. In this application, the base station relays cellular verification signals between the wide area cellular network and the cellular terminal via the wire telephone network. Thus, wireless telephone calls which are routed to the cellular terminal via the base station when the cellular terminal is within the local region of the base station, may be secured by exchange of data between the cellular network and cellular terminal over the wire telephone network via the base station. Calls from the public switched telephone network which are routed through the base station can thus employ the same or similar security systems and methods which are employed by the wide area cellular network. Thus, security of communications between the cellular terminal and telephone base station is preserved. Moreover, since the same cellular verification signals are used, excess overhead during handover is reduced.

Notwithstanding the major improvement of the Dent et al. application described above, there continues to be a need for authentication/handover methods and systems for radio personal communications which preserve security of cellular communications without adding excessive overhead.

SUMMARY OF THE INVENTION

According to the present invention, during handover of a cellular terminal from the wide area cellular network to a base station, authentication messages are relayed between the base station and the wide area cellular network via the cellular terminal. Communications between the cellular terminal and the wire telephone network via the base station are prevented until after authentication takes place. Stated differently, upon entry of the cellular terminal into the local region of the base station, the cellular terminal relays authentication messages between the base station and the wide area cellular network. Use of the wire telephone network for authentication between the cellular terminal and the base station is avoided.

The present invention stems from the realization that during handover from the wide area cellular network to the telephone base station, the cellular terminal has already been authenticated by the wide area cellular network. Thus, the telephone base station, rather than the cellular terminal, should be the subject of authentication. The telephone base station is verified by the wide area cellular network, using the cellular terminal to relay authentication messages between the telephone base station and the wide area cellular network. If the authentication is successful, the cellular terminal is handed over from the wide area cellular network to the telephone base station.

An unexpected advantage is produced by the present invention. In particular, since the present invention authenticates the telephone base station without the need for communication over the wire telephone network, authentication avoids monetary charges which may be instituted by the operator of the wire telephone network as part of an authentication process. Since authentication of a cellular terminal will often fail because the cellular terminal is not authorized to communicate with the particular base station, it is desirable to avoid the use of the wire telephone network (and its potential cost) for authentication between the cellular terminal and the telephone base station. Accordingly, secure handover is provided without adding excess overhead to the system and without adding unnecessary wire network charges to the cellular terminal user.

In a preferred embodiment of the present invention, authentication between a cellular terminal and a telephone base station which connects a wire telephone network to the cellular terminal within a local region in a cell of a wide area cellular network is provided by detecting that the cellular terminal is within the local region. An authentication challenge is then transferred from the wide area cellular network to the base station via radio communication with the cellular terminal. An authentication response is transferred from the base station to the wide area cellular network via radio communication with the cellular terminal. In response to a valid authentication response, communication is initiated between the wire telephone network and the cellular terminal via the base station.

In order to act as a relay, the cellular terminal establishes wireless communications to both the telephone base station and the wide area cellular network. These communications may be established sequentially. In particular, the authentication challenge is transferred from the wide area cellular network to the cellular terminal using a first channel selected from the plurality of channels within the cellular network spectrum. The authentication challenge is then transferred from the cellular terminal to the base station using a second channel selected from the plurality of channels within the cellular network spectrum. An authentication response is transferred from the base station to the cellular telephone using the second channel, and the authentication response is transferred from the cellular terminal to the wide area cellular network using the first channel. Sequential establishment of these communications links is employed since the cellular terminal can typically transmit and receive only on a single cellular channel at a given time.

A cellular terminal which uses Time-Division- Multiple-Access (TDMA) is capable of sequential access to different communications links. Accordingly, in such a TDMA system, the cellular terminal can operate as a relay without breaking and reinstating connections to the wide area cellular network and to the telephone base station. The links between the wide area cellular network and the telephone base station are placed in different time slots. If TDMA is used in combination with Frequency Division Multiple Access (FDMA), different carrier frequencies may also be used. In any event, upon entry of the cellular terminal into the local region of the base station, the wide area cellular network authenticates the base station using the cellular terminal as a relay, and communications between the cellular terminal and the wire telephone network via the base station are only allowed upon authentication of the base station.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
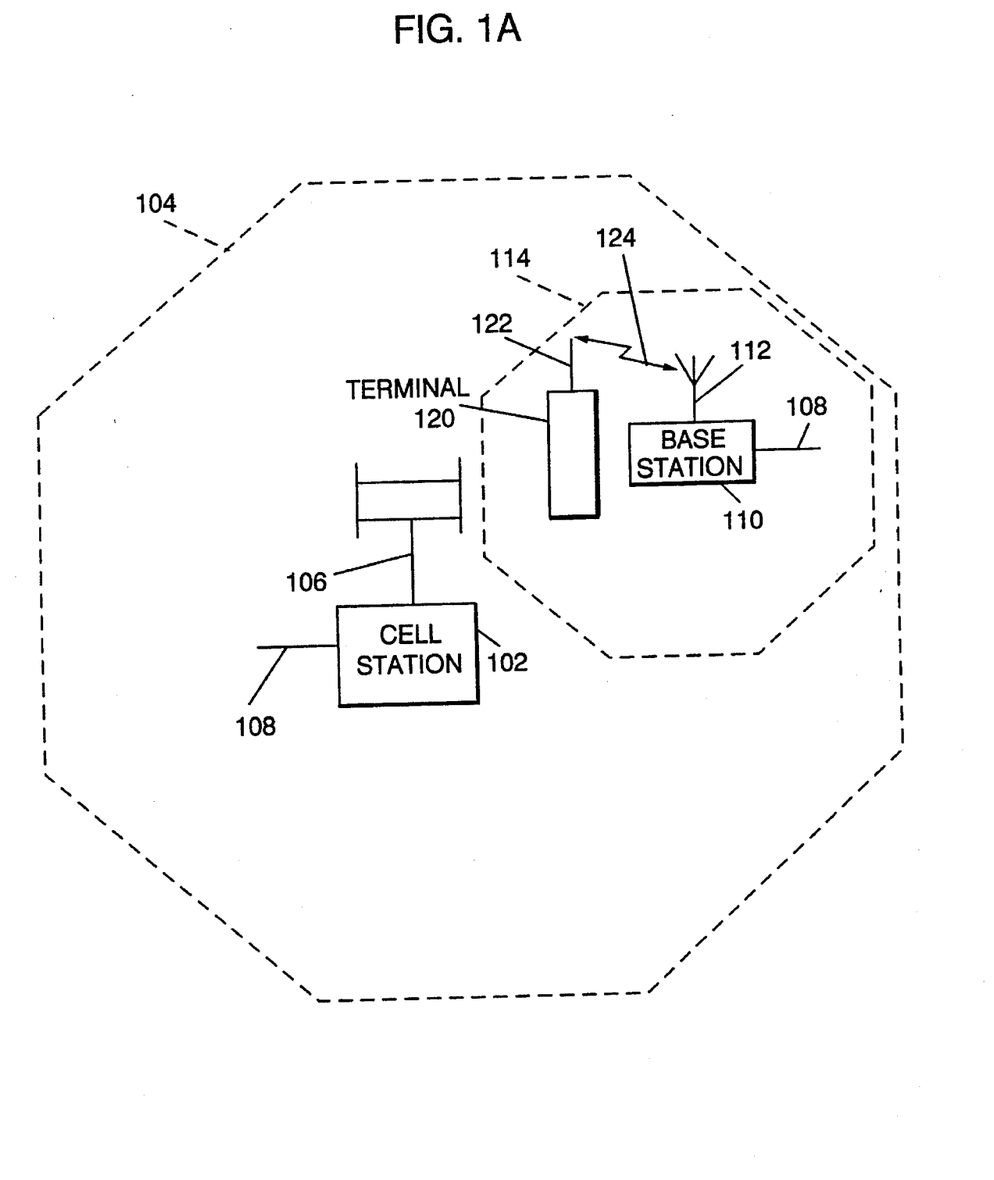
FIGS. 1A and 1B schematically illustrate a radio personal communications system including a base station and a cellular terminal, with radio communications between the terminal and the base station, and alternatively radio communications between the terminal and a wide area cellular network, respectively.
Figure 1B:
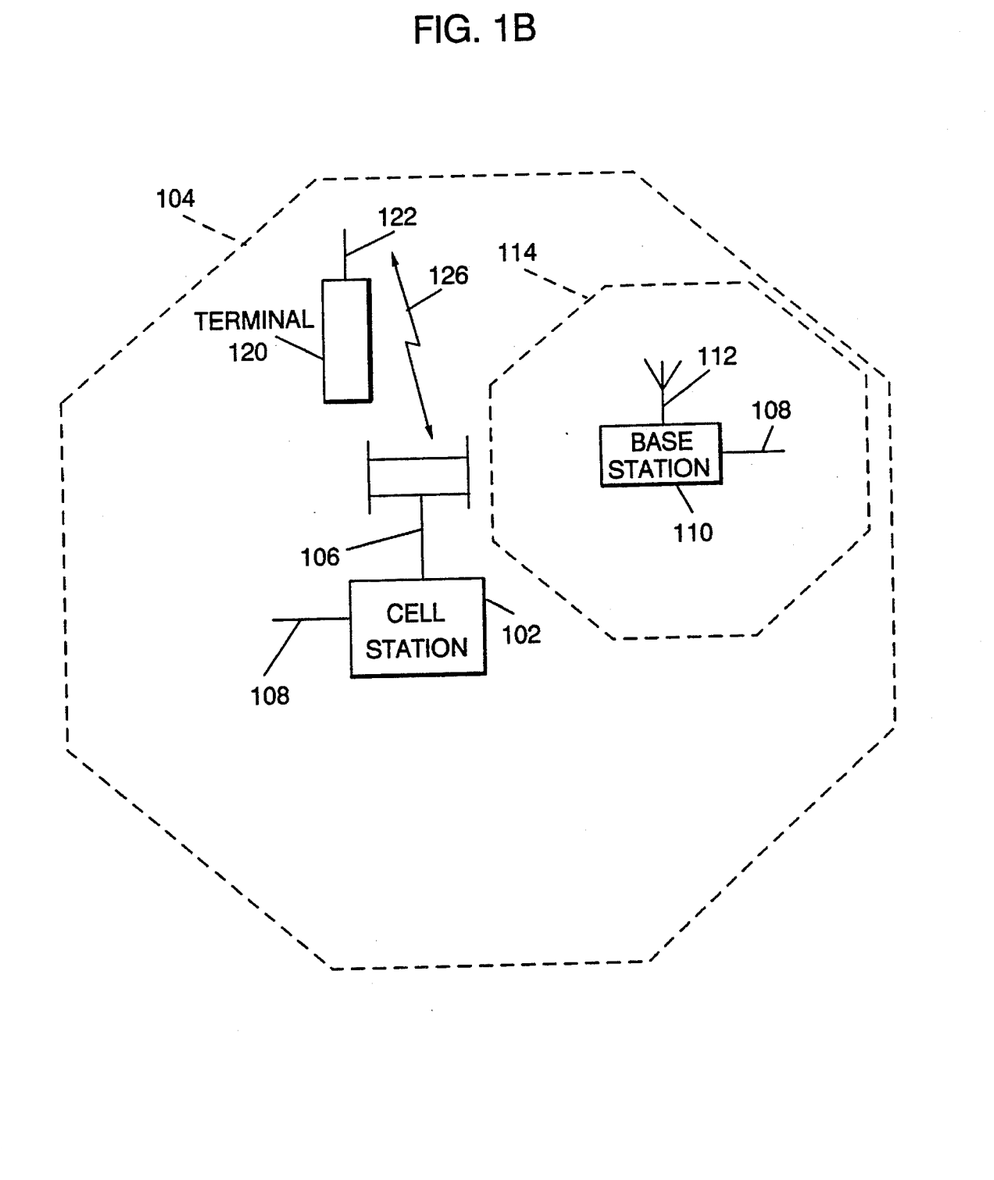

Referring now to FIGS. 1A and 1B, conceptual diagrams of a radio personal communications system according to the present invention are shown. Such a system operates within a wide area cellular network which allocates portions of a plurality of channels within a spectrum to separate geographic cells. Thus, the system provides a wide area wireless communications network having the capacity to provide high quality wireless communications to a large number of users with a limited number of frequencies allocated to the wide area cellular network. As shown in FIG. 1A, a wide area cellular network includes at least one radio network cell station 102, such as a cellular telephone cell station, for transmitting and receiving messages in a network cell range indicated by 104, via cell antenna 106.

Radio network cell station 102 also interfaces with the wire network 108 in special trunk and signalling lines. Wire network 108 is also referred to as the Public Switched Telephone Network (PSTN). PSTN 108 is the regular "wire line" telephone system supplied by, for example, the regional Bell Operating Companies, and may use copper wire, wireless local loop extensions, wideband cable, optical fiber, or other stationary transmission channels.

It will be understood by those having skill in the art that a wide area cellular network typically includes many radio network cell stations 102 (not shown) to cover a large area.

In such a system each radio network cell station 102 covers a cell 104 within wide area cellular network and may be connected to a Cellular Switching Center (MSC), which is a special form of telephone exchange for cellular terminal phones, via special landlines or microwave (wireless) links. The MSC is in turn connected to the wire network 108 via special trunk and signalling lines to provide connectivity between any cell station 102 of the cellular network and the outside world.

Still referring to FIG. 1A, a telephone base station 110 is located within the cell 104 of a network cell station 102 of the wide area cellular network. Base station 110 includes a low power transceiver for transmitting and receiving via base station antenna 112, over a limited base station local region 114, typically on the order of tens of meters. Thus, a base station may be used for transmission and receipt of radio personal communications in a home or office. Base station 110 also is electrically connected to the wire network 108, for example by a normal telephone jack socket. Base station 110 may be wired directly to wire network 108 (in a domestic application for example) or connect through a PABX (not shown) in an office environment, for example.

Still referring to FIG. 1A, a cellular terminal 120 is shown for radio communications with either base station 110 or radio network cell station 102 via antenna 122. Cellular terminal 120 includes a radio telephone such as a cellular phone. Terminal 120 may also include, for example, a full computer keyboard and display, a document scanner, and full graphics and multimedia capabilities.

As illustrated in FIG. 1A, when terminal 120 is in the local region 114 of the base station 110, a radio link 124 therebetween is established. Radio link 124 is preferably a cellular channel link and most preferably uses a cellular channel which is different from the cellular channels used in cell 104 which includes base station 110. As shown in FIG. 1B, when the terminal 120 is outside the local region 114 of the base station 119, but within the cell 104 of the network cell station 102, a new radio link 126 is automatically established with the network cell station 102 to establish communications through wide area cellular network. Thus, when the user is relatively close to the base station 110 (i.e. within the home or office), wireless communications take place with the base station so that the wide area cellular network, with its higher billing rate structure, is bypassed. When the user is relatively far from the base station 110, communications take place with the cellular network.

During idle operation in the wide area cellular network, the cellular terminal continuously scans for signals from the telephone base station for which it is authorized to communicate. These scanning signals are preferably transmitted on channels not used by the wide area cellular network. The signals can (but need not) have information that uniquely identifies the telephone base station. When the cellular terminal recognizes such a telephone base station signal, it will request access to this telephone base station. Before allowing access, the telephone base station performs authentication in order to prevent unauthorized cellular terminals from accessing the base station.

Figure 2:
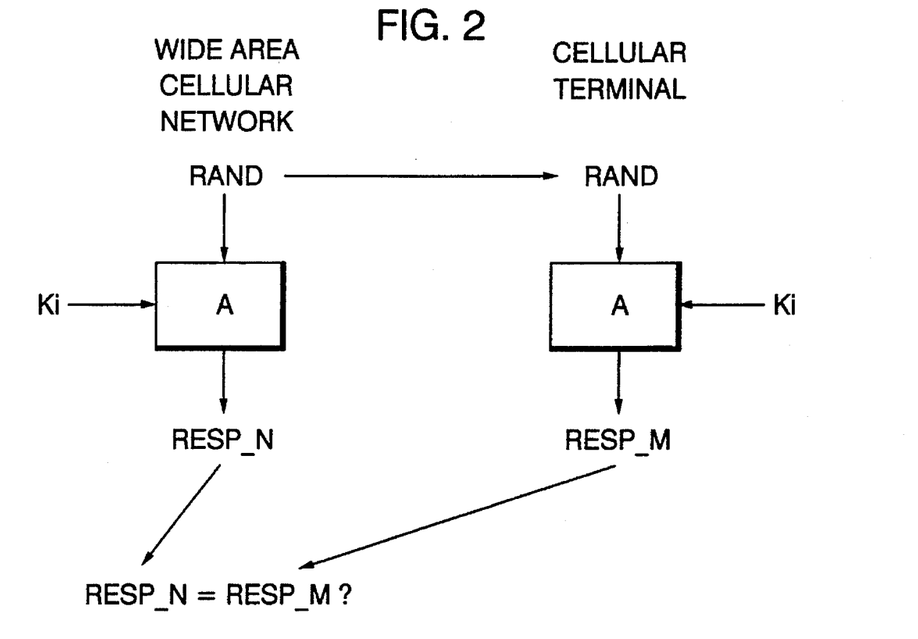
FIG. 2 schematically illustrates a known authentication technique for cellular telephones.

A known authentication technique for conventional cellular telephone applications is shown in FIG. 2. Those skilled in the art will recognize that alternative authentication techniques may be used. Referring to FIG. 2, the wide area cellular network provides a secret key that uniquely identifies the cellular terminal. This secret key Ki is stored both in the cellular terminal and in the wide area cellular network. At the start of an authentication process, the wide area cellular network generates a random number RAND which preferably changes every time a new authentication is performed. This RAND is used as a challenge code and is sent to the cellular terminal. The cellular terminal derives a cellular telephone response RESP_M using a crypto algorithm A that uses Ki and RAND as input. In the wide area cellular network, the same crypto algorithm A with the same Ki and RAND is performed to provide the wide area cellular network matching response RESP_N. As shown in FIG. 2, the cellular terminal sends back its response RESP_M, and the wide area cellular network compares RESP_M with the RESP_N. If they match, the cellular terminal has the correct secret key, and its identity is therefore verified.

The above described authentication process can also be reversed so that the cellular terminal can verify whether it is challenged by the correct network and need not provide personal information to a fraudulent challenger. Authentication in both directions, also referred to as bilateral authentication, is described in U.S. Pat. No. 5,091,942 entitled "Authentication System for Digital Cellular Communications" to Paul W. Dent and assigned to the assignee of the present application, the disclosure of which is hereby incorporated herein by reference.

For security and efficiency, it would be desirable to use the same secret key for all network access attempts, so that only one key need be stored in the cellular terminal. However, for security reasons, the distribution of the secret key among all the telephone base stations should be avoided. The secret key should preferably be stored at one place in the wide area cellular network, such as the home location register. Accordingly, in order for a telephone base station to authenticate a cellular terminal which enters the local region, the base station can connect to the wide area cellular network as described in the above-cited patent application Ser. No. 08/205,705. The base station acts as a relay between the wide area cellular network and the cellular terminal, using the wire telephone network.

The present invention stems from the realization that it is not the cellular terminal that needs authentication, but rather the telephone base station. The cellular terminal is assumed to be operating in the wide area cellular network, and has therefore been authenticated upon entering the wide area cellular network. The cellular terminal need not be authenticated again when the cellular terminal enters the local region of the base station. Instead, the wide area cellular network should verify whether the telephone base station covering the local region into which the cellular terminal has entered, is authorized to operate, and whether the telephone base station is authorized to accept the cellular terminal which enters the local region.

These authentications can be performed according to the Dent et al. Patent application Ser. No. 08/205,705 cited above, using the wire telephone network connection between the wide area cellular network and the telephone base station. However, the wire telephone network connection uses landlines operated by entities other than the wireless operator controlling the wide area cellular network and base station. Therefore, extra charges may be assessed at each authentication procedure. Moreover, a direct wireless link between the wide area cellular network and a base station is generally not possible, since both are designed to transmit on downlink channels and receive on uplink channels.

According to the present invention, the cellular terminal is used as a relay for a direct wireless link between the wide area cellular network and the telephone base station. The cellular terminal can alternately receive signals from the wide area cellular network and relay them to the telephone base station, and receive signals from the telephone base station and relay them to the wide area cellular network.

Figure 3A:
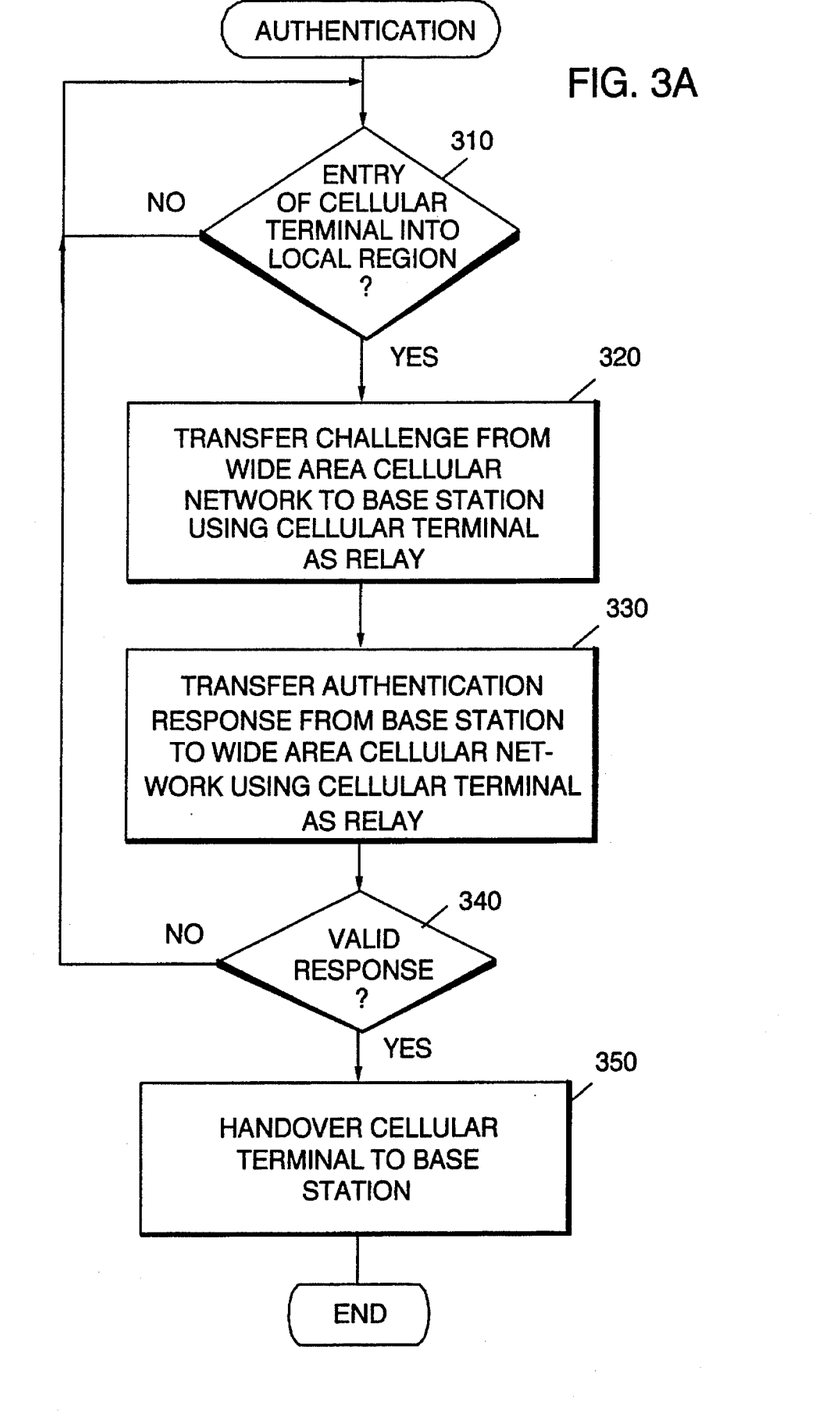
FIG. 3A is a flowchart illustrating authentication according to the present invention.
Figure 3B:
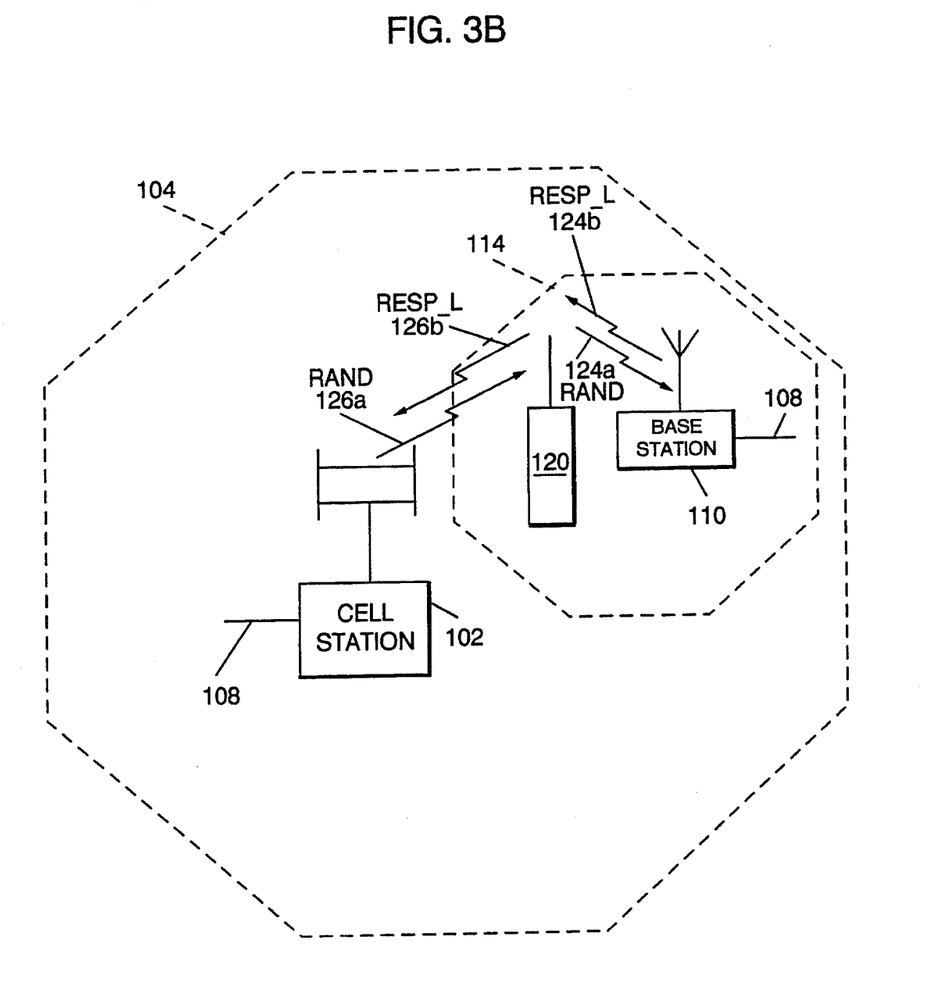
FIG. 3B schematically illustrates a radio personal communication system which performs the authentication of FIG. 3A according to the present invention.

Referring now to FIGS. 3A and 3B, authentication according to the present invention will be described. Authentication is preferably carried out by the control processors of the cell station 102, base station 110 and cellular terminal 120, under stored program control. Special purpose hardware or combinations of special purpose hardware and control processors may also be used. Referring to FIGS. 3A and 3B, entry of the cellular terminal 120 into local region 114 is detected at Block 310 of FIG. 3A, using conventional techniques. Then, at Block 320 a challenge is transferred from wide area cellular network 102 to base station 110 using cellular terminal 120 as a relay. In particular, the wide area cellular network creates a random challenge code RAND, which is sent to the cellular terminal via transmission 126a. The cellular terminal unit relays this random challenge code to the telephone base station via transmission 124a.

Still referring to FIG. 3A, at Block 330, an authentication response is transferred from base station 110 to cell station 102 using cellular terminal 120 as a relay. In particular, the base station calculates a response using the RAND and its secret key Kj, which uniquely identifies the telephone base station, or group of telephone base stations, and sends back the response (RESP_L) to the cellular terminal via transmission 124b. The cellular terminal then sends the telephone base station response RESP_L to the wide area cellular network via transmission 126b. The wide area cellular network compares RESP_L with RESP_N using Kj as input to the crypto algorithm.

During authentication, the cellular terminal acts as a relay. It maintains a duplex connection to both the wide area cellular network and the telephone base station. Most cellular terminals are limited to one (duplex) connection at a time. In this case, the relaying of information occurs sequentially.

Figure 4A:
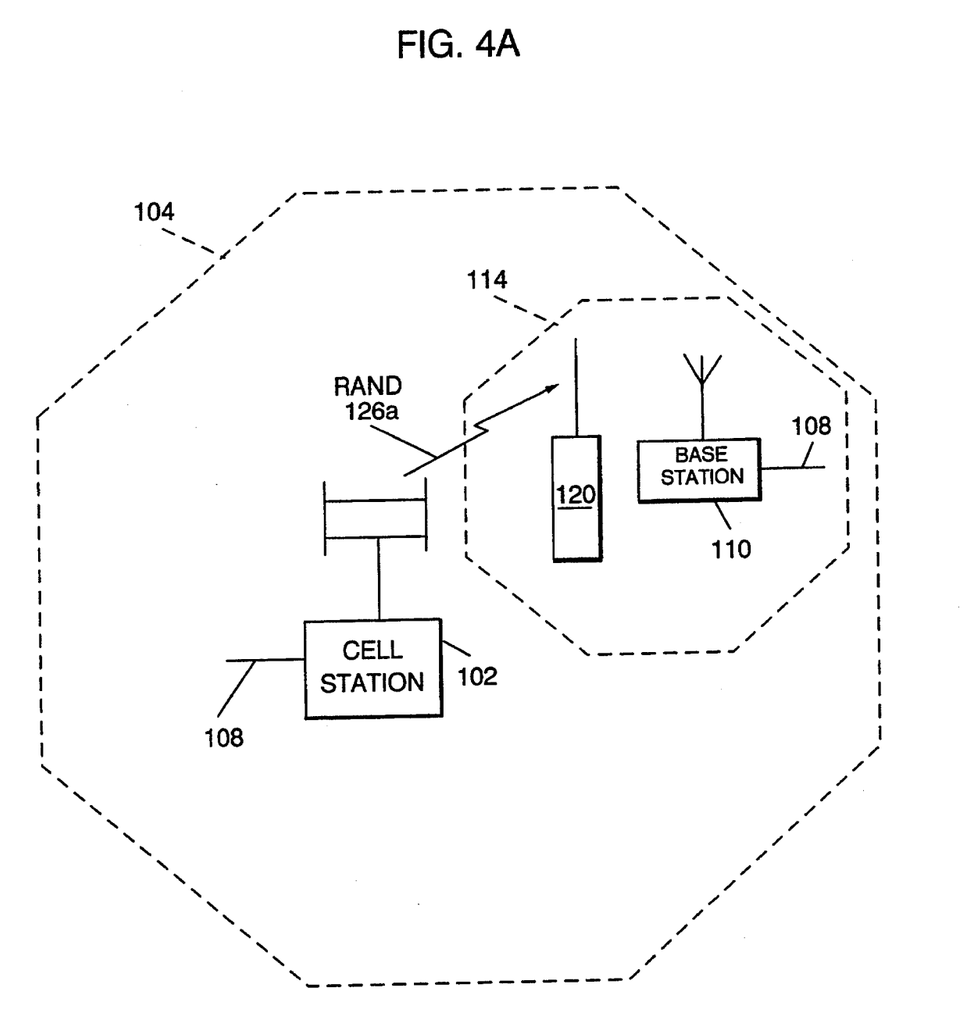
FIGS. 4A–4C illustrate sequential performance of the authentication illustrated in FIG. 3B.
Figure 4B:
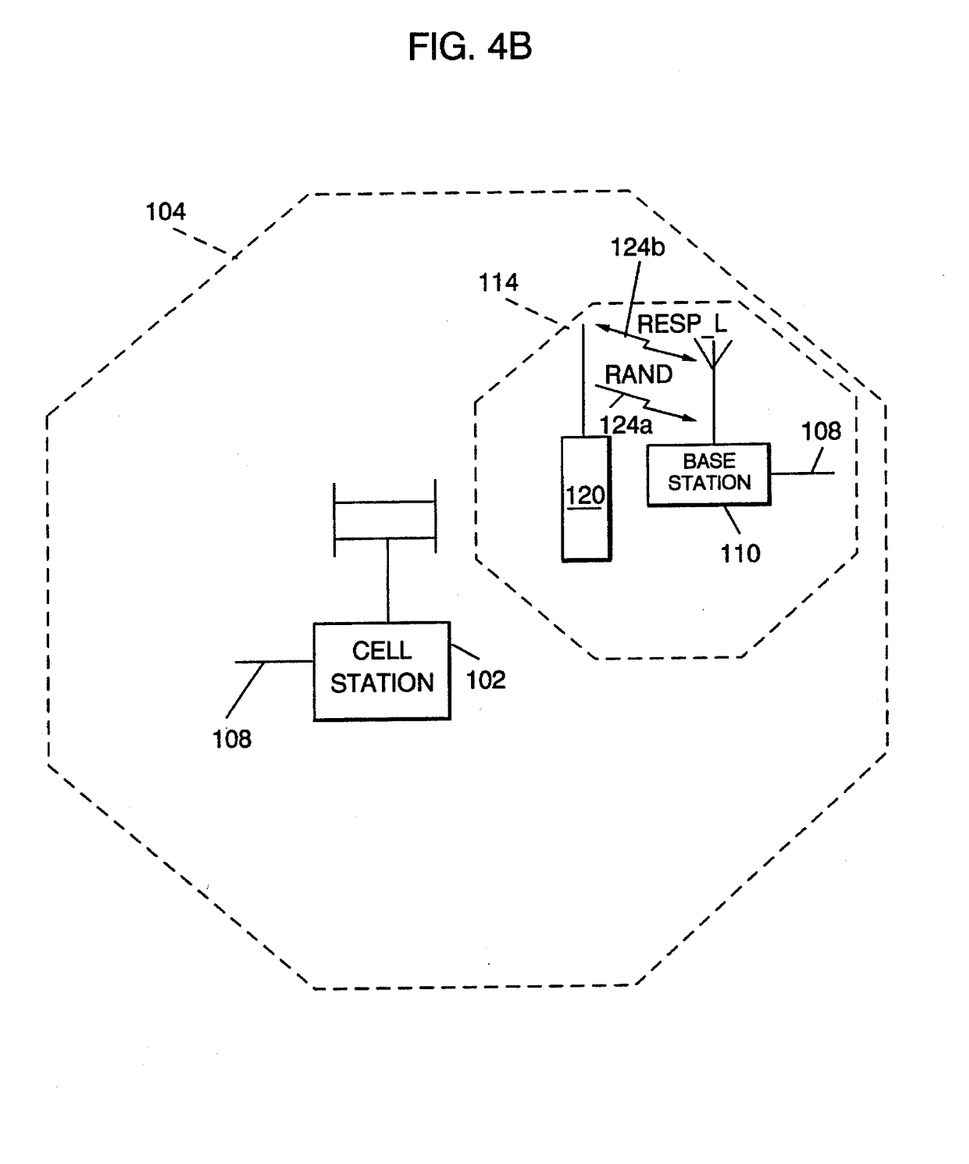
Figure 4C:
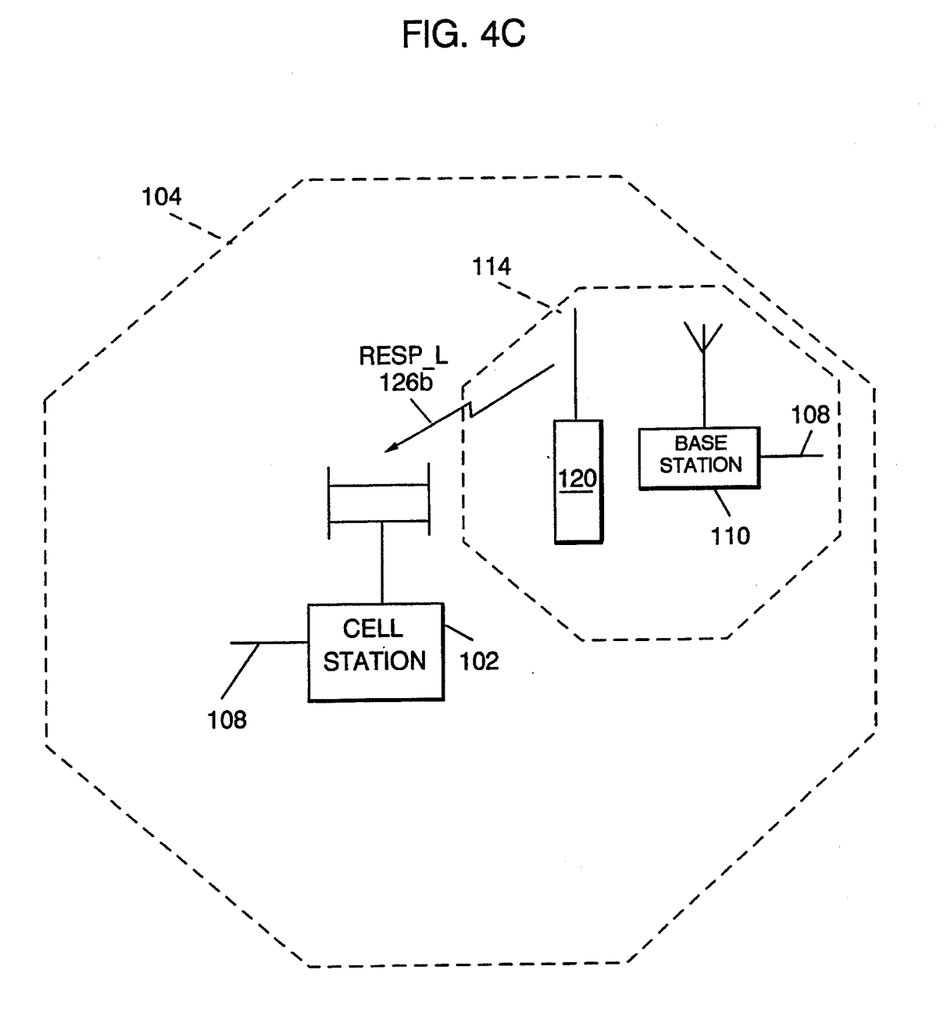

FIGS. 4A–4C schematically illustrate sequential relaying of information. As shown in FIG. 4A, upon entry of the cellular terminal 120 into local area 114, a link 126a is set up between the cellular station 102 and the cellular terminal 120. The RAND is transferred.

Referring to FIG. 4B, the wide area cellular link 126a is broken and a local connection 124a to the base station 110 is made. The cellular terminal transmits the RAND which it received and waits for a return of the local response RESP_L, via link 124b. Preferably, links 124a and 124b use the same cellular channel. Most preferably, this channel is selected to be noninterfering with the cellular channels used in cell 104, as described in application Ser. No 08/148,828 entitled "Radio Personal Communications System and Method" by Paul W. Dent and the present inventor Jaap Haartsen, now U.S. Pat. No. 5,428,668, assigned to the assignee of the present application, the disclosure of which is hereby incorporated herein by reference.

Referring to FIG. 4C, the connection to base station 110 is broken, and the wide area cellular connection 126b is reinstalled. Preferably, the same channel used for the first connection 126a is used. The RESP_L is sent by the cellular terminal to the wide area cellular station, which compares RESP_L to the calculated response.

Referring again to FIG. 3A, at Block 340, the base station 110 can then decide if the cellular terminal 120 can access the telephone base station if the responses match, and if the cellular terminal is authorized to use the telephone base station. Authorization can be determined by linking the cellular terminal key Ki to the different keys Kj of the telephone base stations the cellular terminal is allowed to access. If the telephone base station does not provide a unique identity when the cellular terminal enters the local area, its identity can still be found using its Kj. Since the Kj is not known to the wide area cellular network initially, it is difficult to determine the wide area cellular network's response RESP_N. Instead, the wide area cellular network typically must calculate all the responses RESP_Nj using all the local keys Kj associated with the cellular terminal Ki. This group of keys represents all authorized telephone base stations for the cellular terminal.

If the local response RESP_L matches any of the calculated responses RESP_Nj, the cellular terminal is handed over to base station 110 at Block 350 of FIG. 3A. In this way, all telephone base stations can use the same "beacon" signal to indicate their presence. The authentication procedure will specify which telephone base station is involved. Therefore, the cellular terminal need only scan for one type of local beacon signal.

A wide area cellular network that uses sequential access of different channels is Time-Division-Multiple-Access (TDMA). This system can provide two duplex links simultaneously without breaking one link before initializing another link. Accordingly, operation in a TDMA system may be simplified compared to that illustrated in FIGS. 4A–4C.

Figure 5:
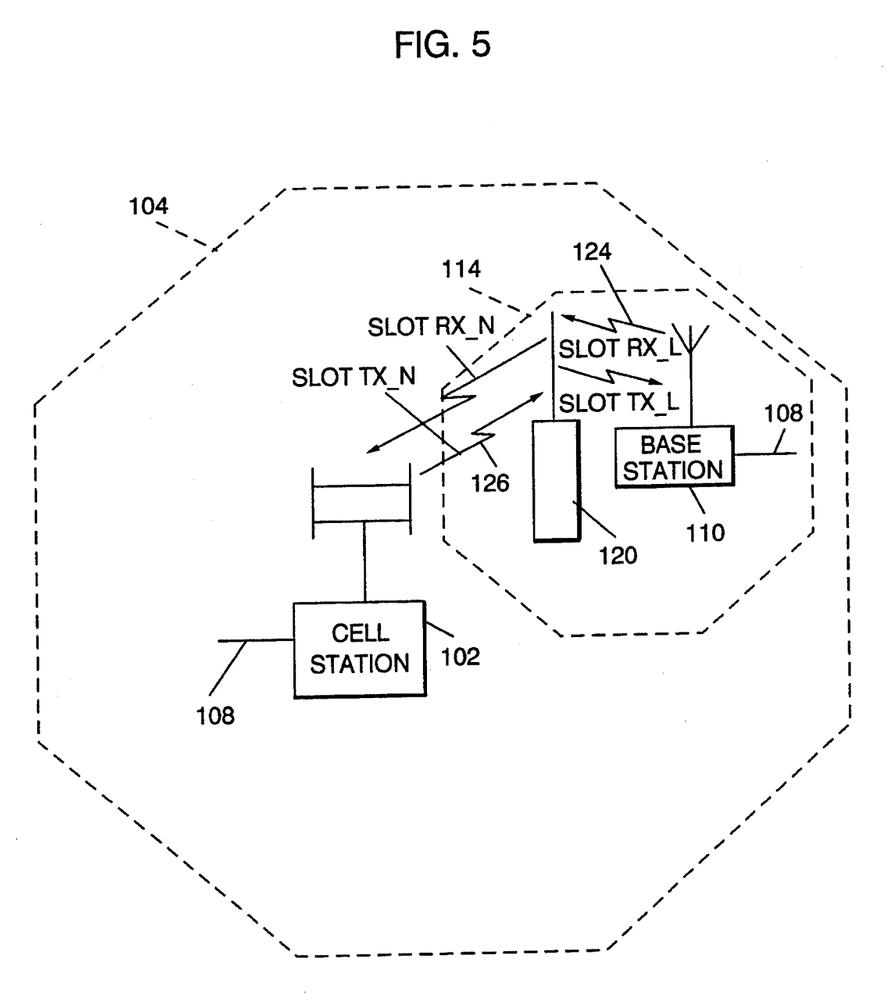
FIG. 5 illustrates authentication according to the present invention in a Time-Division-Multiple-Access (TDMA) system.

Referring to FIG. 5, a TDMA implementation is described. As shown, one slot pair (RX_N and TX_N) is used for uplink and downlink connections to the wide area cellular network 102, and another slot pair (TX_L, RX_L) is used for uplink and downlink connections to the telephone base station 110. In order to isolate the uplink and downlink, the uplink and downlink slots preferably do not overlap.

Figure 6A:
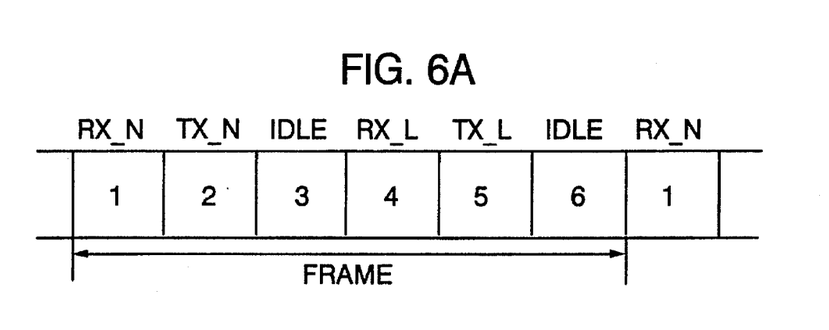
FIGS. 6A and 6B illustrate TDMA frames which may be used to perform authentication according to the present invention.

In order to maintain two duplex links, the TDMA frame should preferably provide at least four slots, as illustrated in FIG. 6A. In the current D-AMPS system (specified by the IS-54 standard), six slots per frame can be obtained when the system is used in half rate mode. It will be understood that half rate mode is generally acceptable for authentication, since only control information, and not speech, is being transferred. The cellular terminal operates at full rate, but at alternating channels.

Figure 6B:
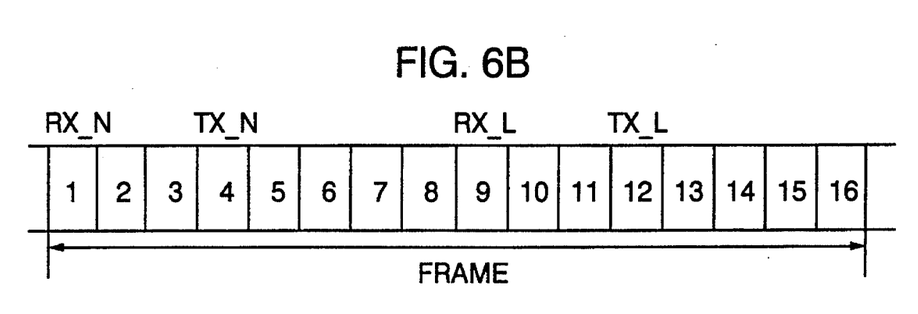

In the Pan-European GSM cellular system, there may not be sufficient idle time between adjacent slots to switch carrier frequencies (either between transmit and receive, or between wide area cellular and base station). Therefore, at least eight slots may be required per frame, so that at least one idle slot is present between two active slots. The frame length of GSM is eight slots per frame. However, the staggering between uplink and downlink is specified to be three slots. Thus, half rate mode may need to be applied, to provide sixteen slots per frame. See FIG. 6B.

It will be understood that TDMA is one example of a sequential access system. Other systems that use sequential processing (e.g. CSMA or ALOHA or other random time access systems) can also allow the cellular terminal to relay authentication signals between the base station and the wide area cellular system according to the invention.

It will also be understood that the wide area cellular network and the telephone base station will generally not be synchronized to each other. However, lack of synchronization should not impact the present invention. The cellular terminal may need to separately synchronize to the wide area cellular network link 126 and the base station link 124.

This can be achieved with known cellular terminals. For example, in order to provide smooth cell handovers among cells of the wide area cellular network, the cellular terminal is usually synchronized to at least two and often as many as seven or more (in GSM) network cell stations. Therefore, synchronization may be readily maintained to two different, mutually nonsynchronized, sources (cell station 102 and base station 110) when the cellular terminal operates as a relay.

It will be understood that when the base station 110 is not covered by the wide area cellular network, the cellular terminal is generally not able to operate as a relay since it cannot connect to the wide area cellular network. In this case, a wireline connection between the wide area cellular and telephone base station may be set up as already described.

The present invention has been described in connection with cellular terminal systems, where the cellular telephone system provides the overall wide area cellular network, and the telephone base station provides personal wireless phone systems for a home or office. However, with future advances in global coverage, the wide area or macro network may be provided by a satellite system, and the local network may range from a cellular telephone system down to a base station 110 described above, and including such diverse networks as ISDN fiber links, cable TV, etc.

The present invention is particularly suitable for such a global system. In such a system, it will be highly desirable for the cellular terminal to link to a local network for cost savings. According to the invention, complicated international links do not need to be initiated in order to transfer the authentication information from the home register in the home country to the local network. In addition, the user may be provided with the same level of authentication security as in the home country. Accordingly, the present invention may be advantageously used to hand over a radio terminal from a macro network to a local network, where the local network is not part of the network hierarchy of the macro network. The local network and macro network can both use an air interface but need not have any direct connection to one another. Accordingly, upon entry of the radio terminal into the local network, the radio terminal relays authentication information between the local network and the macro network, so that the macro network authenticates the local network for communication with the radio terminal.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An authentication method between a cellular terminal and a telephone base station, the telephone base station connecting a wire telephone network to the cellular terminal within a local region in a cell of a wide area cellular network which uses a plurality of channels within a cellular network spectrum, said authentication method comprising the steps of:

detecting that said cellular terminal is within said local region;

transferring an authentication challenge from said wide area cellular network to said telephone base station via radio communication with said cellular terminal;

transferring an authentication response from said base station to said wide area cellular network via radio communication with said cellular terminal; and in response to a valid authentication response, initiating communication between said wire telephone network and said cellular terminal, via said base station.

2. An authentication method according to claim 1 wherein said step of transferring an authentication challenge from said wide area cellular network to said base station comprises the steps of:

transferring said authentication challenge from said wide area cellular network to said cellular terminal using a first channel selected from said plurality of channels within said cellular network spectrum; and transferring said authentication challenge from said cellular terminal to said base station using a second channel selected from said plurality of channels within said cellular network spectrum.

3. An authentication method according to claim 2 wherein said step of transferring an authentication response comprises the steps of:

transferring said authentication response from said base station to said cellular terminal using said second channel; and transferring said authentication response from said cellular terminal to said wide area cellular network using said first channel.

4. An authentication method according to claim 1 wherein said detecting step comprises the step of detecting a telephone base station beacon at said cellular terminal, said telephone base station beacon being free of information which identifies said telephone base station.

5. An authentication method according to claim 4 wherein said initiating step is preceded by the step of comparing the authentication response to a plurality of valid authorization responses which are associated with said cellular terminal.

6. An authentication method according to claim 1 wherein said wide area cellular network is a Time-Division-Multiple-Access (TDMA) cellular network operating at a predetermined rate and wherein said transferring steps are performed at half said predetermined rate.

7. An authentication method according to claim 1 wherein said wide area cellular network is a Time-Division-Multiple-Access (TDMA) cellular network and wherein said transferring steps are performed using at least four nonoverlapping TDMA slots.

8. An authentication method between a cellular terminal and a telephone base station, the telephone base station connecting a wire telephone network to the cellular terminal within a local region in a cell of a wide area cellular network which uses a plurality of channels within a cellular network spectrum, said authentication method comprising the step of:

relaying authentication messages between said telephone base station and said wide area cellular network via said cellular terminal within said local region, without accessing said wire telephone network via said telephone base station.

9. An authentication method according to claim 8:

wherein said relaying step is preceded by the step of detecting that said cellular terminal is within said local region; and wherein said relaying step is followed by the step of initiating communication between said wire telephone network and said cellular terminal, via said base station in response to authentication.

10. An authentication method according to claim 9 wherein said detecting step comprises the step of detecting a telephone base station beacon at said cellular terminal, said telephone base station beacon being free of information which identifies said telephone base station.

11. An authentication method according to claim 8 wherein said wide area cellular network is a Time-Division-Multiple-Access (TDMA) cellular network operating at a predetermined rate and wherein said relaying step is performed at half said predetermined rate.

12. A handover method between a radio terminal and a local network base station, the local network base station connecting a local network to the radio terminal within a local region of the local network base station, the local region overlapping a macro network, said handover method comprising the steps of:

detecting that said radio terminal has entered said local region;

causing said macro network to authenticate said local network base station via radio communication with said radio terminal; and allowing communications between said radio terminal and said local network via said local network base station upon authentication of said local network base station.

13. A handover method according to claim 12 wherein said causing step comprises the step of causing said macro network to authenticate said local network base station via said radio terminal, without using said local network.

14. A handover method according to claim 12 wherein said causing step comprises the step of relaying authentication messages between said local network base station and said macro network via said radio terminal within the local region, without accessing the local network via said local network base station.

15. A radio personal communications system comprising:

a wide area cellular network, including a plurality of cells, each of which uses a plurality of channels within a cellular network spectrum;

a wire telephone network;

a cellular terminal;

a telephone base station within one of said cells, said telephone base station connecting said wire telephone network to said cellular terminal when said cellular terminal is within a local region of said telephone base station;

means for detecting that said cellular terminal is within said local region;

challenge transferring means, responsive to said detecting means, for transferring an authentication challenge from said wide area cellular network to said telephone base station via radio communication with said cellular terminal;

response transferring means, responsive to said challenge transferring means, for transferring an authentication response from said base station to said wide area cellular network via radio communication with said cellular terminal; and means for initiating communication between said wire telephone network and said cellular terminal, via said base station, in response to a valid authentication response.

16. A radio personal communications system according to claim 15 wherein said challenge transferring means comprises:

means for transferring said authentication challenge from said wide area cellular network to said cellular terminal using a first channel selected from said plurality of channels within said cellular network spectrum; and means for transferring said authentication challenge from said cellular terminal to said base station using a second channel selected from said plurality of channels within said cellular network spectrum.

17. A radio personal communications system according to claim 16 wherein said response transferring means comprises:

means for transferring said authentication response from said base station to said cellular telephone using said second channel; and means for transferring said authentication response from said cellular terminal to said wide area cellular network using said first channel.

18. A radio personal communications system according to claim 15 wherein said detecting means comprises means for detecting a telephone base station beacon at said cellular terminal, said telephone base station beacon being free of information which identifies said telephone base station.

19. A radio personal communications system according to claim 15 wherein said wide area cellular network is a Time-Division-Multiple-Access (TDMA) cellular network operating at a predetermined rate and wherein said challenge transferring means and said response transferring means operate at half said predetermined rate.

20. A radio personal communications system comprising:

a wide area cellular network, including a plurality of cells, each of which uses a plurality of channels within a cellular network spectrum;

a wire telephone network;

a cellular terminal;

a telephone base station within one of said cells, said telephone base station connecting said wire telephone network to said cellular terminal when said cellular terminal is within a local region of said telephone base station; and means for relaying authentication messages between said telephone base station and said wide area cellular network via said cellular terminal within said local region, without accessing said wire telephone network via said telephone base station.

21. A radio personal communications system according to claim 20 further comprising:

communication initiating means, responsive to said relaying means; for initiating communication between said wire telephone network and said cellular terminal, via said base station, in response to authentication.

* * * * *